Oct. 22, 1963     E. W. OLSON     3,107,898
ENGINE MOVING APPARATUS
Filed Nov. 7, 1960
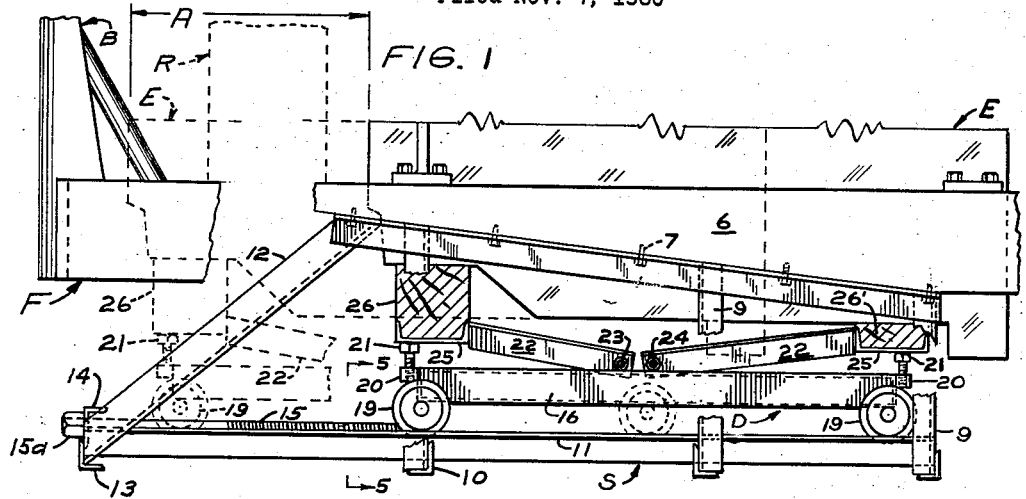
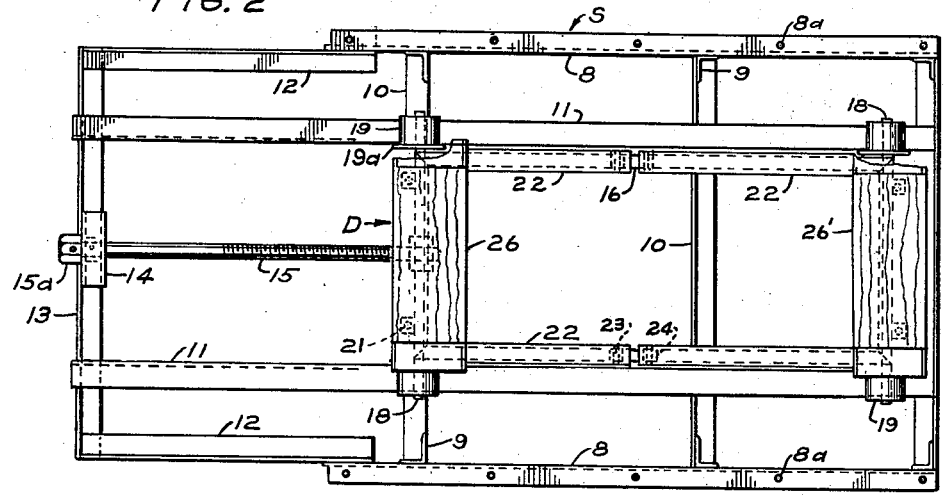
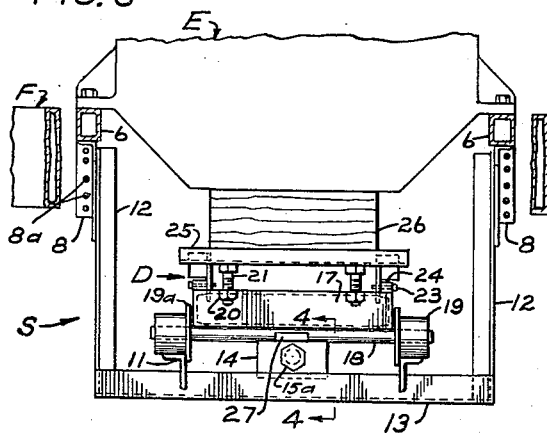
INVENTOR
ELWOOD W. OLSON
BY
Williamson + Palmatier
ATTORNEYS

United States Patent Office 3,107,898
Patented Oct. 22, 1963

3,107,898
ENGINE MOVING APPARATUS
Elwood W. Olson, Rte. 1, Box 164, Center City, Minn.
Filed Nov. 7, 1960, Ser. No. 67,822
2 Claims. (Cl. 254—85)

This invention relates to apparatus for removing, transporting and reinstalling portions of automotive and tractor power plants or units thereof, and particularly to apparatus for easily removing, changing the position of and accurately reinstalling the engines of large tractor units, such for example as the well known Caterpillar DW21 tractor of which there are presently a large number in use throughout the country and throughout the world, although the apparatus of this invention is not limited to such specific use.

Tractor power plants, and even their component units are exceedingly heavy, cumbersome and difficult to handle. The units comprising these power plants, such as the engine, clutch and transmission are usually mounted in aligned juxtaposed separably connected relationship. In effecting repairs on the various units of these tractor power plants, the engine or some other power plant unit must frequently be removed or shifted from its normal mounted position on the vehicle either to repair the particular unit being moved or to move it to an out-of-the-way position in order to effect the desired repairs and work on the remaining units. To remove these heavy units such as the engine to an out-of-the-way position, the units are conventionally disengaged from the remainder of the vehicle and are lifted by means of any suitable hoisting mechanism and transported to some location usually remote from the vehicle while the necessary repairs are taking place.

One object of this invention is an engine carrier device which permits a single operator to remove and reinstall a tractor engine without additional help in an easy and efficient manner.

A further object is to provide a device for removing a tractor engine from its normal installed position to an out-of-the-way position and subsequently reinstalling the engine in precisely the position it was in prior to removal upon its initial replacement or seating in position, without requiring a plurality of adjustments or seatings, and with a minimum of effort on the part of the operator.

Still another object is a device of the class described which is adapted for mounting directly on the tractor frame until the repair work has been completed, whereby it is possible to move if necessary the entire tractor including the engine removal and reinstalling device while undergoing repair while maintaining the engine in a safe out-of-the-way position on the vehicle.

An even more specific object is an engine transporting or moving device which is adapted to be mounted on the chassis or frame of the tractor and which carries thereon engine transporting mechanism such as a transport trolley or dolly also having jack means thereon for raising and lowering the engine into and out of seated placements respectively, in which the transport dolly or trolley is adapted for guided movement to enable the engine to be dismounted or unseated and moved to an out-of-the-way position and subsequently returned to its precise original location.

These and other objects and advantages of my invention will more fully appear from the following description made in connection with the accompanying drawings and wherein like reference characters refer to the same or similar parts throughout the several views, and in which:

FIG. 1 is a side elevational view of the engine removing and reinstalling means of my invention shown in mounted relationship with a portion of a tractor with portions thereof broken away for clarity;

FIG. 2 is a top plan view;

FIG. 3 is an end elevational view as viewed from the front of FIG. 1, with portions of the tractor broken away for clarity;

FIG. 4 is a detail sectional view taken approximately along the line 4—4 of FIG. 3; and FIG. 5 is a detail sectional view taken along the line 5—5 of FIG. 1.

Reference is now made to the accompanying drawings for a more detailed description of one preferred form of the invention illustrated therein.

In FIG. 1, the engine carrying device of this invention is shown mounted in operative position on the front end portion of a tractor beneath the engine. The portion of the tractor shown is a somewhat diagrammatic representation of the front end portion of the aforementioned DW21 tractor as viewed from the left side thereof. The tractor structure shown includes a portion of the outer chassis frame F which supports the tractor engine E, and other auxiliary members such as the front bumper B and the radiator R which is shown in dotted outline. Between the sides of the outer frame F, a pair of longitudinally extending laterally spaced apart supporting frame members 6 are provided, between and on which the engine E is mounted. The bottom edges of these frame members 6 are inclined upwardly and forwardly and have a series of suitable threaded sockets provided along the length thereof for receiving cap screws 7 which normally are utilized to mount protective rock guards (not shown) to the underside of the frame members and their flange portions to protect the engine and other mechanism disposed thereabove. The clutch and transmission (not shown) are disposed rearwardly of the engine. To accomplish certain repairs and servicing, the engine must be removed from its normal installed operative position. Normally, this is accomplished by disconnecting the engine from the supporting frame and the transmission and hoisting it to an out-of-the-way position. However, by removing the front bumper B and the radiator R, there is an area of free space A between the front end of the engine and the front end of the tractor frame F where the engine can be shifted or removed to, after disconnecting thereof, by the engine carrying device of this invention to enable the desired repair and service work to be accomplished.

The engine carrying apparatus of this invention includes a dolly supporting frame structure indicated generally by S which is detachably mounted on and suspended from the frame members 6 after the rock guard has been removed therefrom, which frame structure is suspended above the ground and transportable with the tractor, and which supports an engine carrying dolly D thereon.

The dolly supporting frame S includes the longitudinally extending laterally spaced apart inclined top mounting angle members 8 which are provided with a longitudinally extending series of apertures 8a adapted for alignment with the threaded sockets in the bottom of the frame members 6 and designed to be attached to the underside of the supporting frame members 6 by suitable fastening means such as the rock guard cap screws 7 which extend through the apertures 8a and are threadably received by said sockets. Each of the top frame members 8 has secured thereto and depending therefrom a plurality of vertically disposed side frame members 9, with the corresponding side frame members 9 on opposite sides of the frame being interconnected and braced at their lower end portions by means of transversely disposed bracing members 10 upon which are mounted a pair of laterally spaced longitudinally extending rail members 11. A pair of upwardly and rearwardly inclined front supporting members 12 are also provided which extend between the front ends of the top members 8 and the outer end portions of the front transverse rail supporting member 13 which member 13 is supported by said members 12, to which member 13 the front end portions of the rails are secured and by which they are supported. It will be noted that the top frame members 8 are inclined at an angle corresponding to the angle of taper of the bottom edges of the frame members 6 whereby the rails 11 and the dolly D are maintained in substantially horizontal suspended state above the ground. The front cross member 13 has mounted thereon an upstanding anchoring plate 14 which is provided with a suitable aperture therein in which is journaled the front end of a longitudinally extending rotatable forward and reversing puller bolt or traversing screw member 15 for moving the dolly D, the screw member 15 being held against longitudinally axial movement by means of a polygonal head 15a disposed on the outer or front side of the anchoring plate and a lock collar 15b located on the opposite or inner side of the anchor plate.

The engine carrier or transport dolly D in the form shown consists of a generally rectangular frame including the side members 16 and the end members 17 which are rigidly welded together. Front and rear axle members 18 are welded to the dolly frame and have mounted on the outer ends thereof the rollers 19 which are adapted to travel on the rails 11, said rollers having inner guide flanges 19a which engage the inner edges of the rails and prevent lateral movement of the dolly while guiding the dollies' longitudinal movement. Pairs of laterally spaced apart threaded jack nuts 20 are welded or otherwise secured to the front and rear end members 17 of the dolly frame, which jack nuts threadedly receive laterally spaced apart pairs of vertical jack screws 21 which may be raised and lowered by turning same.

The cradle or saddle means for engaging and carrying the engine includes independent raisable and lowerable front and rear units which are similarly constructed. Each of the saddle units includes a pair of jack pad arms 22, the inner ends of which are pivotally mounted on the side frame members 16 of the dolly by means of horizontal transverse hinge pins 23 journaled in and supported by bearings 24 carried by the members 16. Each saddle unit also includes a channel shaped jack pad seat member 25 which is transversely disposed and mounted on the outer ends of the arms 22 for swinging movement about the hinge pins 23. The seat members 25 rest on their respective jack screws and are raised and lowered thereby. The seat members 25 have removably seated therein suitable jack pads such as the wooden blocks 26 and 26', which are adapted to engage the bottom of the engine at the front and back respectively and support and carry the engine properly balanced on the dolly.

A U-shaped bracket or cage 27 is suspended from the front axle as by welding, and has enclosed therewithin a nut 28 which is threadedly mounted on the inner end of the traversing screw 15 and held against rotation by the bracket 27. Thus, rotation of the traversing screw causes the dolly to move longitudinally thereof in either direction, depending on which way the screw is turned. Since the screw is anchored against longitudinal axial movement, the dolly is held against longitudinal movement by the screw, and cannot move except in response to the turning of the screw. Thus, there is no danger of the dolly and the engine carried thereon moving or shifting accidentally, particularly when the tractor itself is moved while the engine is disconnected and supported by the dolly.

To use the apparatus of this invention, the way is cleared for mounting the supporting frame S on and beneath the tractor frame and engine by removing any interfering structure such as rock guards and the like, and the supporting frame is mounted to the tractor frame members 6 by any suitable fastening means such as the cap screws 7, which in the Caterpillar tractors of the DW21 type are utilized also to mount the rock guards on the frame members 6. Any other disconnections can be then made such as removing the radiator, the front bumper and disconnection of the oil and fuel lines, then the front motor support cap screws are removed and all but one of the fly wheel clutch housing bolts. The front jack screws under the front jack pads are then turned to raise the front jack pad and raise the motor free, after which the remaining housing bolt is removed and the rear jack screws are turned to raise the rear jack pad and with it the rear of the engine so that the entire engine is completely supported or carried on the dolly. The traversing screw 15 is then turned in one direction such as with a ratchet and socket or electric wrench fitted over the head 15a thereof to pull the dolly and the engine forwardly into the free area A to the broken line position of FIG. 1, thereby moving the engine away from the other units of the power plant such as the clutch and transmission and leaving ample room for completing the repairing and servicing thereof. Upon the completion of the servicing and repairing of the clutch and transmission, the screw member is turned in the opposite direction, causing backing up or reverse movement of the dolly and with it the engine carried thereon until the engine has been returned to precisely the same position it was originally in. The jack screws are then lowered, thereby lowering the engine into proper mounted relationship with the tractor frame. The engine is then properly aligned with the remainder of the power plant mechanism and all that needs be done is for the power plant units to again be operatively interconnected and the engine properly secured to the tractor frame. The cap screws are then removed to dismount the frame F and dolly D from the tractor, and the rock guard is remounted by means of the same cap screws.

From the foregoing, the advantages of this invention are readily apparent. By providing a supporting frame for the dolly which can be detachably mounted on and suspended from the tractor frame, and by mounting a traversing jack unit for controlled guided movement on the supporting frame, said unit including the dolly and the engine saddle means comprising the pivotally mounted jack screw operated front and rear jack pads, the need or necessity for an overhead hoist is completely eliminated and permits the entire repair job to be accomplished by a single individual if desired. This prevents cranes or hoists from being tied up on tractor repair work and enables them to be more profitably utilized elsewhere, and provides more pleasant and safer work conditions for the mechanics. By suspending the frame F and the dolly D entirely from the tractor itself, the entire mechanism of this invention becomes a part of the tractor temporarily and can be readily moved with the tractor if necessary during and before the completion of the repair operation, without interfering with said repair operation and without necessitating reinstalling and removing any of the individual parts and without disturbing the engine, since the dolly cannot move except in response to turning of the traversing screw. The guided restrained movement of the dolly permits the engine to be returned precisely to the position it was originally in to substantially and materially cut down reinstallation time and labor, while at the same time reducing the amount of man power necessary to complete the job, since the apparatus of this invention can be operated by a single person.

It will be further appreciated that the tractor mounted structure of this invention is far superior to any ground mounted or supported structure, since the ground on the job location is muddy, sandy or uneven and generally entirely unsuited to supporting such mechanism.

It will, of course, be understood that various changes may be made in the form, detail, arrangement and proportion of the parts without departing from the scope of my invention which consists of the matter described herein and set forth in the appended claims.

What I claim is:

1. Apparatus for moving a power plant unit of an automotive vehicle comprising a dolly supporting frame which includes vertically spaced apart upper and lower structure and side structure interconnecting said upper and lower structure, means for securing said upper structure to the underside of said vehicle and beneath said unit to be moved whereby said frame is suspended from said vehicle above ground level for movement therewith, track means carried by said lower structure, a dolly mountable on said track means for guided movement thereon relative to said frame, jack means carried by said dolly for engaging and supporting said unit to be moved, and screw means mounted on said frame and cooperatively engaged with said dolly for moving said dolly relative to said frame on said track means.

2. Apparatus for moving a power plant unit of an automotive vehicle comprising a dolly supporting frame, means for suspending said frame from said vehicle beneath said unit and above ground level whereby said frame is movable with said vehicle, track means supported by said frame, a dolly mountable on said frame for guided movement on said track means, jack means carried by said dolly for engaging and supporting said unit, and screw means cooperatively interconnecting said dolly and said frame for moving said dolly on said track means, said jack means including a pair of jack pads disposed at opposite ends of said dolly, arm means having one end thereof secured to said pads and the other end pivotally connected to said dolly whereby said pad can be raised and lowered, and jack screws carried by said dolly and adapted to raise and lower said pads.

References Cited in the file of this patent

UNITED STATES PATENTS

| | | |
|---|---|---|
| 178,390 | Taylor et al. | June 6, 1876 |
| 394,439 | Beckert | Dec. 11, 1888 |
| 1,131,018 | Troutman | Mar. 9, 1915 |
| 1,850,969 | Russell et al. | Mar. 22, 1932 |
| 2,198,414 | Panchuk | Apr. 23, 1940 |
| 2,706,056 | Talley et al. | Apr. 12, 1955 |
| 2,901,218 | Scott | Aug. 25, 1959 |

FOREIGN PATENTS

| | | |
|---|---|---|
| 300,336 | Great Britain | Nov. 15, 1928 |